May 31, 1966  K. R. LARSON  3,253,463
CHECKING AND TESTING DEVICES FOR COIL SPRINGS AND THE LIKE
Filed Nov. 13, 1961
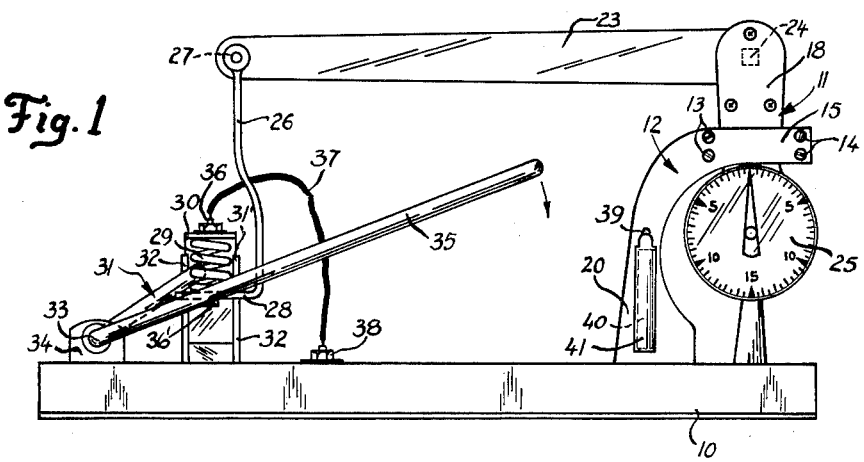
Fig. 1
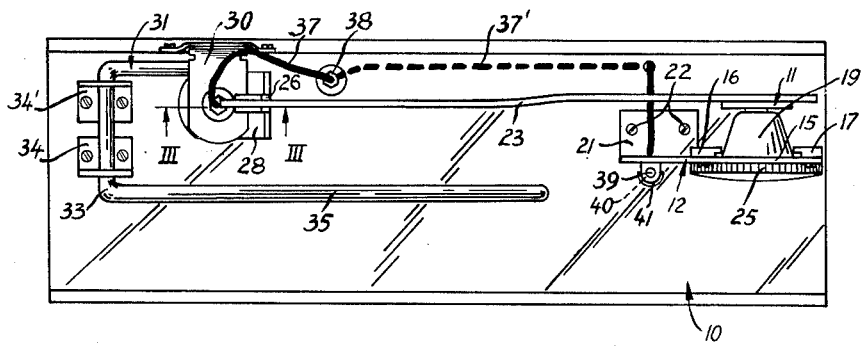
Fig. 2
Fig. 3
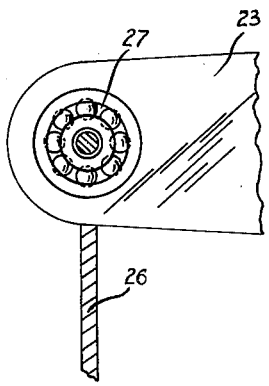
Fig. 4
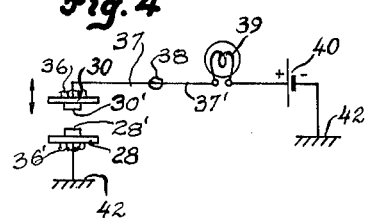
INVENTOR.
KENNETH R. LARSON
BY
ATTORNEY

United States Patent Office 3,253,463
Patented May 31, 1966

3,253,463
CHECKING AND TESTING DEVICES FOR COIL SPRINGS AND THE LIKE
Kenneth R. Larson, Des Plaines, Ill., assignor to Snap-On Tools Corporation, Kenosha, Wis., a corporation of Delaware
Filed Nov. 13, 1961, Ser. No. 151,841
7 Claims. (Cl. 73—161)

This invention relates to checking and testing devices for compression springs and the like, although it may be used for many and varied types of measuring devices, and more particularly in relation with and as a test for torque wrenches with a spring of known and standarized characteristics and compression values.

It contemplates more especially the provision of simple and inexpensive instrumentalities in combination with any suitable calibrated measuring apparatus such as an accurate torque wrench of the torsion type fully described and disclosed in United States Letters Patent No. 2,312,104 and others which have experienced commercial success over the years and which can be adapted to checking and testing coil or compression springs or vice versa in that the latter may be used as a basis for testing the accuracy of the wrench or measuring instrument itself.

While the structure and concept can be utilized for checking the accuracy of measuring instruments such as a torque wrench, this disclosure is primarily concerned with a simple and dependable checking device for compression springs which is inexpensive and constitutes an effective portable instrumentality utilizable in any production line for inspecting compression springs before their use by the assembler so that defective ones may be readily eliminated without entailing much time, labor or expense.

One object of the present invention is to provide a simple and improved type of checking and testing device for compression springs and the like or given a standard spring of known characteristics to check measuring instruments such as a torque wrench and the like.

Another object is to provide a simple spring compression mechanism in operative relation to a measuring instrumentality such as a torque wrench to determine whether or not springs of any selected type and characteristics conform to required standards for any particular assembled device.

Still another object is to combine a simple spring compression mechanism with a torque measuring wrench to provide an inexpensive spring checking and testing device on a production basis.

A further object is to provide a simple and inexpensive spring compression device in conjunction with a standard measuring instrumentality to enable the minimum values of conformation of predetermined spring elements prior to use in assembly operations.

A still further object is to provide a simple spring compression mechanism with a torque wrench measuring device so related operatively through a beam and visual indicators as to enable the predetermined minimum requirements of spring characteristics to be detected on a production basis before being selected for assembly into other devices dependent thereupon.

Other objects and advantages will appear from the following description of an illustrated embodiment of the present invention.

In the drawing:

FIGURE 1 is a side view in elevation of the device comprising features of the present invention.

FIGURE 2 is a top plan view of the device illustrated in FIGURE 1.

FIGURE 3 is a fragmentary sectional view taken substantially along line III—III of FIGURE 2.

FIGURE 4 is a diagrammatic wiring diagram of the visual indicator for which the device may be preset for energization at any desired degree of compression.

The structure selected for illustration is not intended to serve as a limitation upon the scope or teachings of the present invention, but is merely illustrative thereof. There may be considerable variations and adaptations of all or part of the teachings thereof depending upon the dictates of commercial practice. The present invention comprises a base 10 preferably of rectangular configuration which is cast, stamped or otherwise shaped from sheet material to provide a support for testing and checking instrumentalities to be presently described. The testing instrumentalities embody a standard measuring instrument, in this instance a calibrated torque measuring wrench 11 of the torsion type fully described in the Letters Patent specified supra. The self-contained torsion wrench 11 is vertically disposed and rigidly mounted in a bracket 12 which has threaded fasteners 13–14 projecting through the horizontal arm 15 of the bracket 12 to threadedly engage retainer lugs 16–17 to support the torsion wrench 11 with the bracket arm 15 in contact with the wrench plate 18 and the retainer fasteners 13–14 engaging the cover 19 thereof.

The bracket 12 is curved downwardly to provide a vertical arm 20 that has a horizontal base offset 21 (FIGURE 2) to enable the attachment thereof by fasteners 22, to the base 10 which supports all the instrumentalities and provides portability therefor and thereto. A relatively long and horizontally extending lever beam 23 of the cantilever type projects from and engages the polygonal drive shaft 24 of the torque or torsion wrench work engaging head, and to this end the lever beam 23 has an aperture which is complemental to and which will register with the polygonal torque wrench shaft 24 to serve as a work load actuator therefor in much the same manner as it does in its use as a wrench for turning nuts or other fasteners tight to a predetermined degree and indicate the extent of the force in either inch or foot pounds. In the present embodiment, it is the lever beam 23 that applies the turning moment to the drive 24 to register on the calibrated dial 25 responsive to urging the lever beam 23 in a counterclockwise direction (viewed from FIGURE 1) and register the load force on the torque or torsion wrench 11 through the medium of its calibrated dial 25. It should be stated that a torsion wrench is a particular type of torque measuring wrench and these terms are interchangeably used to denote the same type of measuring instrument.

To the end of urging the lever beam 23 in a counterclockwise direction (viewed from FIGURE 1), the free end of the latter is provided with a depending hook 26 which is journalled at its upper end and suspended pivotally with negligible friction by a ball bearing rotary stud assembly 27 of standard construction (FIGURE 3). The hook 26 depends from the free end of the lever beam 23 which at its fulcrum point or that of the rotary ball bearing assembly 27 is exactly one foot from the point of lever beam attachment with the torque or torsion wrench work engaging shaft 24 in order to provide a simple multiple of the calibrated meter 25 thereof. The depending hook 26 is offset to provide a flat bottom support 28 to sustain, in this instance, a compression spring 29 which is to be load tested and checked for a predetermined compression at a predetermined load to be measured by the calibrated dial mechanism 25 and visually indicated for reaching its preset degree of compression by a light that is energized in a manner to be hereinafter described.

In order to retain the spring 29 and enable its compression and measurement, the flat bottom support plate 28 is confronted by a horizontal plate member 30 which has a vertical leg 31' that slides into and along a stationary vertical edge flanged guide plate 32 fixed to the base 10 to telescopically receive the vertical leg 31' of the spring compression plate 30, thereby frictionally and operatively confining the spring 29 between the confronting interguided plates 28–30 which are relatively displaceable by the torque measuring wrench 11. The suspended bottom plate 28 and the top confronting plate 30 serve as freely accessible spring confining elements which compress the spring 29 and successive springs readily inserted therebetween and rendered responsive to an actuator mechanism to be presently described. Thus, the confronting frictionally confining plates 28–30 position the springs 29 that are singly disposed therebetween for successive testing. The actuator for the top spring confining plate 30 consists, in this instance, of a lever arm 31 that extends longitudinally of the base 10 and has an offset end (not shown) that pivotally engages the vertical leg 31' of the top plate 30. The lever arm 31 has a laterally offset portion 33 which is journalled in brackets 34–34' fastened to the base 10 to enable the pivotal oscillation thereof through the medium of an elongated handle arm 35 that is considerably longer than the lever arm 31 but extends in the same general direction and parallel thereto to serve as a manual actuator for the top plate 30.

The displacement of the handle arm 35 in a clockwise direction (viewed from FIGURE 1) not only serves to hold the base 10 fast on a table or work bench, but also displaces the top plate 30 downwardly to compress the spring 29 the desired distance which is preset and indicated by a visual signal as will be described hereinafter. It should be noted that the compression of the spring 29 as described supra transmits the force of compression to the bottom plate 28 which, in turn, will correspondingly displace the lever beam 23 in a counterclockwise (viewed from FIGURE 1) responsive to the urge imparted by the loaded or compressed spring 29. The greater the spring compression, the correspondingly greater action of the spring 29 on its supporting plate 28 to register on the dial 25 the foot pounds or foot inches of force required for a predetermined spring compression determined by initial setting in relation to a visual indicator to be described hereinafter.

To this end of providing a visual indicator for any predetermined extent of compression, terminal contacts 36–36' are adjustably mounted through but insulated from the confronting plates 28–30, and these have inwardly confronting lugs 28'–30' which are adjusted to establish contact when the spring 29 has been compressed to its desired predetermined degree and is thus contracted sufficiently to permit the terminal lugs 28'–30' to effect contact and thereby energize the electric light bulb 39 by closing the circuit to the dry cell battery 40 which is confined in a metallic casing 41 preferably though not essentially mounted to the bracket 12 proximate to the calibrated dial 25 comprising part of the measuring instrument, in this instance, a torque or torsion wrench 11. The electrical circuit (FIGURE 4) is closed through the base 10 serving as a ground 42 so that a single wire connects between the insulated terminals 36–38 and extends as a continuing wire 37' beneath the base 10 to connect with the light bulb 39. The terminal connector for the wires 37–37' is insulated as at 38 relative to its mount on the base 10 so that the flexible wire 37 will yield with the displacement of the terminal 36 with the top plate 30.

For any given and known spring size, the characteristics and function thereof and their intended assembled purpose in any device, it is known how great the compression should be for any specified inch or foot pounds of force exerted in the compression to simulate its function in any device for the best results. To this end, a cylindrical hollow collar may be provided to measure the desired predetermined extent of compression, and this collar is placed in the saddle defined by the confronting plates 28–30, and then the terminal lugs 28'–30' (FIGURE 4) adjusted to make contact while the collar is in position. This will energize the light bulb 39 and thereafter the device is set for any type of spring corresponding to the collar height as commensurate with the known degree of compression for a particular run of springs to be checked. At the time the light 39 is energized, the dial reading 25 is noted and if this corresponds to the known value desired for that extent of compression, the spring 29 is satisfactory.

The other way around, if a known standard spring measures up to the characteristics desired, the accuracy of the torque wrenches 11 may be tested and checked with this same device and is an important dual function which is accomplished with a very inexpensive and dependable device. It is the purpose and function of the present invention, its concepts and teachings, to enable springs of any given size, strength, and characteristics to be tested and checked on a production basis and vice versa to check torque wrenches against known value standard springs so that this relatively inexpensive apparatus will dependably check and test both compression springs and measuring instrumentalities on a large volume basis at labor costs that are minimum with a minimum investment in test equipment.

While I have illustrated and described a preferred embodiment of my invention, it must be understood that my invention is capable of considerable variation and modification without departing from the spirit of the invention, I, therefore, do not wish to be limited to the precise details of construction set forth, but desire to avail myself of such variations and modications as come within the scope of the appended claims.

I claim:

1. In a checking and testing device, the combination with a frame, of means for mounting a measuring instrumentality on said frame for rigid support, relatively slidable spring confining and compression frictional spring engaging plate surface members, one of said relatively slidable plate members mounted to said frame, said relatively slidable friction spring engaging plate members being in spaced relation to said measuring instrumentality, a lever beam operatively extending between said measuring instrumentality and the other of said relatively slidable spring confining and compression plate members to render the former commensurately responsive to the latter to check and test the characteristics of either the spring between said confining members or said measuring instrumentality, said relatively slidable spring confining and compression spring engaging members include a spring supporting member suspended from said lever beam, and a manually displaceable plate interguided with said spring supporting member for compressing the spring against said supporting member responsive to manual force applied to said measuring instrumentality through the spring confined between said engaging members.

2. A device of the character defined in claim 1 wherein the spring supporting member and the displaceable plate of said relatively slidable spring engaging members are interguided for moveable positioning in confronting relation, and each is provided with electrical terminals insulated therefrom for adjustment relative to each other to establish contact at the point the spring is compressed to the predetermined extent.

3. A device of the character defined in claim 2 wherein a visual electric indicator is placed in a circuit with a power source and said interguided confining members for connection to said insulated electrical terminals.

4. A device of the character defined in claim 1 wherein the spring supporting member and the displaceable plate of said relatively slidable spring engaging members are in confronting relation to confine springs therebetween, and each is provided with adjustable terminal plugs to serve as a limit for the extent of spring compression which is capable of predetermination for any given type of spring.

5. A device of the character defined in claim 4 wherein a visual indicator and an electrical circuit with a power source includes said terminal plugs.

6. A device of the character defined in claim 5 wherein the compression plate of said relatively slidable spring confining members is rendered slidable toward and from said spring supporting member by a crank arm operatively connected thereto for compressing and releasing the spring confined therebetween.

7. A device of the character defined in claim 6 wherein the crank arm is manually depressed in the direction of the frame to render such stable against a supporting surface during the compression of the spring to an extent that energizes the visual indicator and a calibrated reading on the torque wrench determines the extent of the force utilized to the predetermined point of compression of said spring.

References Cited by the Examiner

UNITED STATES PATENTS

| | | | |
|---|---|---|---|
| 2,170,197 | 8/1939 | Gumprich | 73—161 |
| 2,340,277 | 1/1944 | Sturtevant | 73—161 |
| 2,518,408 | 8/1950 | Weyand | 73—161 |

DAVID SCHONBERG, *Acting Primary Examiner.*

ROBERT EVANS, JOSEPH P. STRIZAK, RICHARD C. QUEISSER, *Examiners.*

R. J. ERICKSON, *Assistant Examiner.*